(12) United States Patent
Yoshino

(10) Patent No.: US 6,817,277 B2  
(45) Date of Patent: Nov. 16, 2004

(54) DEVICE FOR CONTROLLING HYDRAULIC PRESSURE OF CONSTRUCTION MACHINE

(75) Inventor: Kazunori Yoshino, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 89 days.

(21) Appl. No.: 10/344,268

(22) PCT Filed: Jun. 21, 2002

(86) PCT No.: PCT/JP02/06230  
§ 371 (c)(1), (2), (4) Date: Feb. 10, 2003

(87) PCT Pub. No.: WO03/019017  
PCT Pub. Date: Mar. 6, 2003

(65) Prior Publication Data  
US 2004/0060205 A1 Apr. 1, 2004

(30) Foreign Application Priority Data  
Aug. 24, 2001 (JP) ........................ 2001-255215

(51) Int. Cl.⁷ ................................ F15B 11/04
(52) U.S. Cl. ........................... 91/364; 91/435
(58) Field of Search ............... 60/422, 463; 91/361, 91/362, 364, 435

(56) References Cited

U.S. PATENT DOCUMENTS 4,643,074 A * 2/1987 Gunda et al. ................ 91/361
4,884,402 A * 12/1989 Strenzke et al. .............. 91/364

FOREIGN PATENT DOCUMENTS

| EP | 1414059 A2 | * | 4/2004 | ............ F15B/9/09 |
| JP | 60-34501 A |   | 2/1985 |  |
| JP | 60034501 A | * | 2/1985 | ............ F15B/9/09 |
| JP | 62-297502 A |  | 12/1987 |  |
| JP | 11-199178 A |  | 7/1999 |  |
| JP | 2001-107902 a |  | 4/2001 |  |

* cited by examiner

*Primary Examiner*—Thomas E. Lazo  
(74) *Attorney, Agent, or Firm*—Birch, Stewart, Kolasch & Birch, LLP

(57) ABSTRACT

The invention relates to a hydraulic control apparatus for a construction machine. The hydraulic control apparatus includes a target velocity table (4) which stores target actuation velocities of a hydraulic actuator (30) corresponding to operation amounts of the operation member (2) to be operated by the operator, a target acceleration table (5) which stores target actuation accelerations of the hydraulic actuator (30) corresponding to operation amounts of the operation member (2), and one of the target velocity table (4) and the target acceleration table (5) can be selected by operation of a selection switch (3) by the operator. Further, by the control means, the target value corresponding to the operation amount of the operation member (2) using the table selected by the selection switch (3), and a control valve (17) for controlling the pressure oil supplying amount from a hydraulic pump (16) to the hydraulic actuator (30) is controlled based on the set target value. Consequently, the operation characteristic of the hydraulic actuator (30) can be changed in accordance with the liking of the operator.

10 Claims, 1 Drawing Sheet

DEVICE FOR CONTROLLING HYDRAULIC PRESSURE OF CONSTRUCTION MACHINE

This application is the national phase under 35 U.S.C. § 371 of PCT International Application No. PCT/JP02/06230 which has an International filing date of Jun. 21, 2002, which designated the United States of America.

TECHNICAL FIELD

The present invention relates to a hydraulic control apparatus for a construction machine such as a hydraulic excavator, a wheel loader or a crane.

BACKGROUND ART

A hydraulic excavator which is a kind of a construction machine includes a lower traveling unit, an upper revolving unit disposed for revolving motion on the upper side of the lower traveling unit and a working apparatus provided on the upper revolving unit for carrying out several kinds of operation. Several kinds of hydraulic actuators for driving the lower traveling unit, upper revolving unit and working apparatus, particularly, a traveling motor for causing the lower traveling unit to travel, a revolving motor for revolving the upper revolving unit with respect to the lower traveling unit and hydraulic cylinders (a boom cylinder, an arm cylinder, and a bucket cylinder) for driving the working apparatus to work are mounted on the hydraulic excavator.

The hydraulic actuators described above are operated by an operation lever disposed in an operator cab, and normally, the actuation velocity of each hydraulic actuator is determined in response to the operation amount of the operation lever. Accordingly, in the prior art, where the operator wants to operate each hydraulic actuator with a fixed velocity, the operator keeps the operation lever at a fixed position, but, where the operator wants to accelerate the actuation velocity of the hydraulic actuator, operation of the operation lever is performed such that the operation amount thereof is gradually increased.

However, the liking for an operation characteristic of the hydraulic actuators is different among different operators. Therefore, it cannot absolutely be said that such an operation characteristic that the actuation velocity of the hydraulic actuator corresponds to the operation amount of the operation lever as in the prior artisan optimum operation characteristic to all operators. Further, it is considered that the liking for the operation characteristic maybe different, even if the same operator operates, depending upon the hydraulic actuator to be operated, and further, even if the same operator operates the same hydraulic actuator, depending upon the working situation thereof.

The present invention has been made in the light of such a subject as described above, and it is an object of the present invention to provide a hydraulic control apparatus for a construction machine by which an operation characteristic of a hydraulic actuator can be changed in accordance with liking of an operator.

DISCLOSURE OF THE INVENTION

In order to achieve the object described above, a hydraulic control apparatus for a construction machine of the present invention comprises, in addition to a target velocity table in which target actuation velocities of a hydraulic actuator corresponding to operation amounts of an operation member to be operated by an operator are stored, a target acceleration table in which target actuation accelerations of the hydraulic actuator corresponding to the operation amounts of the operation member are stored such that one of the target velocity table and the target acceleration table can be selected by operation of a selection switch by the operator. Further, by control means, a target value corresponding to the operation amount of the operation member is set using the table selected by the selection switch to control, based on the set target value, a control valve for controlling a pressure oil supplying amount from a hydraulic pump to the hydraulic actuator.

By the configuration just described, the operator can optionally select, by operating the selection switch, one of such control that the actuation velocity of the hydraulic actuator is adjusted based on the operation amount of the operation member and such control that the actuation acceleration of the hydraulic actuator is adjusted based on the operation amount of the operation member, and as a result, the operation characteristic of the hydraulic actuator can be easily changed in accordance with the liking of the operator. Further, vibration of the hydraulic actuator can be suppressed to improve the operation performance, and as a result, injurious vibration can be prevented to reduce the fatigue of the operator.

Preferably, the control means described above is configured such that a first signal correlating to the actuation velocity or the actuation acceleration of the hydraulic actuator is detected by first signal detection means and the detected first signal is differentiated or integrated by second signal calculation means, and the actuation velocity or the actuation acceleration of the hydraulic actuator different from that of the first signal is calculated. Further, the control means is configured such that, one of the first signal detected by the first signal detection means and the second signal calculated by the second signal calculation means is selected in an interlocking relationship with the selection of the selection switch and is compared with the target value by comparison means, and a control signal for controlling the control valve is produced by control signal production means (a proportional circuit, a proportional integrating circuit, a proportional integrating and differentiating circuit or the like) based on a comparison signal from the comparison means.

By the configuration described above, if one of the actuation velocity and the actuation acceleration of the hydraulic actuator is detected, then both of feedback control based on the actuation velocity and feedback control based on the actuation acceleration can be carried out, and as a result, a sensor or the like for the feedback control based on the actuation acceleration need not be newly provided. In particular, if only software is modified, then the operation characteristic of the hydraulic actuator can be adapted to the liking of the operator.

In this case, preferably the control means described above includes a band-pass filter for passing a vibration component signal only of a characteristic frequency of pressure vibration of the hydraulic actuator and frequencies around the characteristic frequency but cutting a DC component from within the comparison signal, a high-pass filter for extracting a positive vibration component signal from the vibration component signal having passed through the band-pass filter, a low-pass filter for extracting a negative vibration component signal from the vibration component signal having passed through the band-pass filter, and control signal correction means for correcting the control signal using the signal from the high-pass filter and the signal from the low-pass filter. With the hydraulic control apparatus, vibration components in the control signal can be suppressed and attenuated in a positive manner.

Preferably, the selection switch is configured such that the target velocity table can be selected as a basic table but the target acceleration table can be selected when necessary by the selection switch. As a control method of the hydraulic actuator, such a control method that the actuation velocity is adjusted in response to the operation amount of the operation member is commonly used. Therefore, with such a configuration as described above, a sense of incongruity when the operator transfers from some other construction machine to a construction machine to which the present invention is applied can be eliminated, and further, also an operation miss arising from a change of the operation characteristic can be prevented.

BEST MODE FOR CARRYING OUT THE INVENTION

Figure 1:
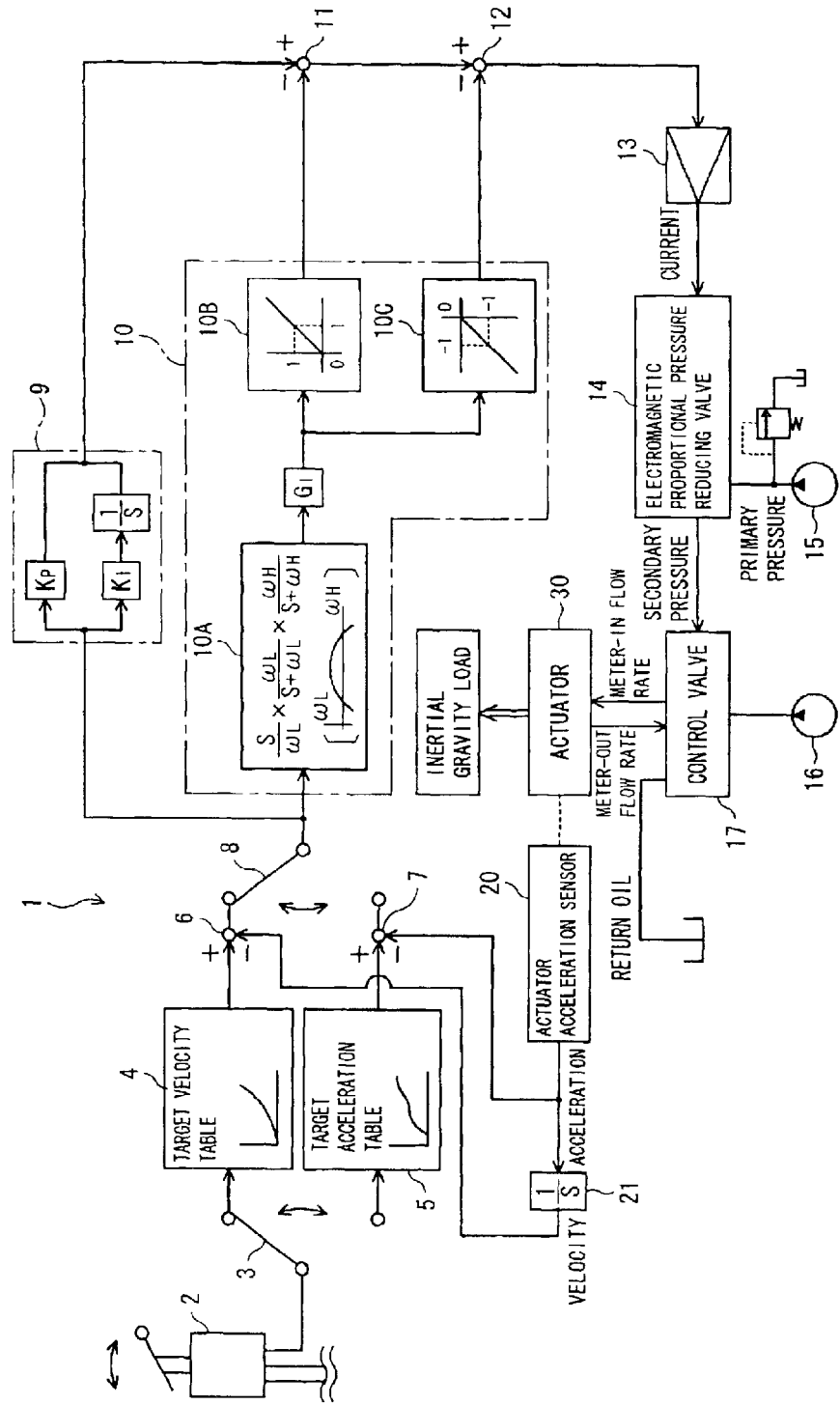
FIG. 1 is a hydraulic circuit diagram and a control block diagram showing a configuration of a hydraulic control apparatus for a construction machine according to an embodiment of the present invention.

In the following, an embodiment of the present invention is described with reference to the drawing.

FIG. 1 shows a hydraulic control apparatus for a construction machine as an embodiment of the present invention. In the present embodiment, as shown in FIG. 1, the hydraulic control apparatus 1 controls a hydraulic actuator 30 by feedback control based on an operation amount of an operation stick (operation member) 2.

The hydraulic control apparatus 1 includes two tables of a target velocity table 4 and a target acceleration table 5 as tables for setting a target control value in response to an operation amount of the operation stick 2. The target velocity table 4 is a table which stores a relationship between the operation amount of the operation stick 2 and the actuation velocity of the hydraulic actuator 30, and the target acceleration table 4 is a table which stores a relationship between the operation amount of the operation stick 2 and the actuation acceleration of the hydraulic actuator 30. A selection switch 3 is interposed between the operation stick 2 and the target velocity table 4 and target acceleration table 5 such that, by switching the selection switch 3, an instruction value (electric signal) corresponding to the operation amount of the operation stick 2 is inputted from the operation stick 2 to the target velocity table 4 or from the operation stick 2 to the target acceleration table 5. It is to be noted that, in an initial state, the selection switch 3 is switched to the target velocity table 4 side so that it is a default table (basic table), but can be switched, by operation of the operator, to the target acceleration table 5 side when necessary.

The target velocity table 4 determines a target actuation velocity corresponding to the instruction value from the operation stick 2 and outputs it. The output signal is inputted to a comparator (comparison means) 6 and compared with an actual actuation velocity signal. The actual actuation velocity signal (second signal) is obtained by integrating an actual actuation acceleration of the hydraulic actuator 30 detected by an actuator acceleration sensor (first signal detection means) 20 using an integrator (second signal calculation means) 21, and indicates an actual actuation velocity of the hydraulic actuator 30. Meanwhile, the target acceleration table 5 determines a target actuation acceleration corresponding to the instruction value from the operation stick 2 and outputs it. The output signal is inputted to a comparator (comparison means) 7 and compared with an actual actuation acceleration signal (first signal) from the acceleration sensor 20.

One of the comparators 6 and 7 is selectively connected to an instruction value follow-up control circuit (control signal production means) 9 and an active vibration control circuit 10 by an interlocking switch 8. The interlocking switch 8 operates in an interlocking relationship with the selection switch 3, and if the selection switch 3 selects the target velocity table 4 side, then the interlocking switch 8 selects the comparator 6 side. Consequently, a comparison signal between the target actuation velocity signal and the actual actuation velocity signal is inputted from the interlocking switch 8 to the instruction value follow-up control circuit 9 and the active vibration control circuit 10. On the other hand, if the selection switch 3 selects the target acceleration table 5 side, then the interlocking switch 8 selects the comparator 7 side, and as a result, a comparison signal between the target actuation acceleration signal and the actual actuation acceleration signal is inputted from the interlocking switch 8 to the instruction value follow-up control circuit 9 and the active vibration control circuit 10.

The instruction value follow-up control circuit 9 and the active vibration control circuit 10 are provided in parallel. While the instruction value follow-up control circuit 9 is a circuit for producing a control signal from the comparison signal from the first comparator 6 or the second comparator 7, in the present embodiment, it is configured as a proportional-plus-integral control circuit.

Meanwhile, the active vibration control circuit 10 has a configuration wherein a high-pass filter 10B and a low-pass filter 10C are connected in parallel to a bandpass filter 10A through a gain G1. The bandpass filter 10A is a filter for passing only a characteristic frequency of pressure vibration generated in the hydraulic actuator 30 and vibration components around the characteristic frequency but cutting a DC component. $\omega L$ in the transfer function of the bandpass filter 10A indicates an angular frequency of the vibration component to be passed on the lower limit side, and $\omega H$ indicates an angular frequency of the vibration component to be passed on the upper limit side.

The vibration component signal having passed through the bandpass filter 10A is multiplexed by the gain G1, and the resulting signal is inputted in parallel to the high-pass filter 10B and the low-pass filter 10C. In the high-pass filter 10B, a positive vibration component signal is extracted from the vibration component signal multiplied by the gain G1 when passing through the bandpass filter 10A, and in the low-pass filter 10C, a negative vibration component signal is extracted from the vibration component signal multiplied by the gain G1 when passing through the bandpass filter 10A. The signal shaving passed through the high-pass filter 10B and the low-pass filter 10C are inputted to comparators (control signal correction means) 11 and 12, respectively.

In the comparators 11 and 12, deviations between the control signal from the instruction value follow-up control circuit 9 and the vibration component signals having passed through the high-pass filter 10B and the low-pass filter 10C are calculated, respectively. Then, a signal wherein the vibration component signals are corrected from the control signal is outputted as a corrected control signal to an amplifier 13. In the amplifier 13, the control signal is increased and inputted as control current to an electromagnetic proportional pressure reducing valve (pilot valve) 14.

A pilot pump 15 is connected to the electromagnetic proportional pressure reducing valve 14 such that hydraulic pressure (primary pressure) from the pilot pump 15 is inputted thereto. The electromagnetic proportional pressure reducing valve 14 reduces the primary pressure in response to the control current from the amplifier 13 and inputs the resulting pressure as a pilot pressure (secondary pressure) to a control valve (controlling valve) 17.

The control valve 17 is interposed between a main pump (variable capacity type hydraulic pump or the like) 16 and the hydraulic actuator 30. Then, the control valve 17 is operated by the pilot pressure from the electromagnetic proportional pressure reducing valve 14 and controls the supplying amount (meter-in flow rate) of pressure oil to the hydraulic cylinder 30.

By such a configuration as described above, with the hydraulic control apparatus 1 of the present embodiment, if the operator operates the selection switch 3 to select the target velocity table 4 side, then the hydraulic actuator 30 is controlled so as to work with a actuation velocity corresponding to the operation amount of the operation stick 2. In this case, if the operator keeps the operation amount fixed, then the operator can cause the hydraulic actuator 30 to work at a fixed actuation velocity, but if the operator varies the operation amount, then the operator can cause the hydraulic actuator 30 to accelerate or decelerate. Further, if the operator returns the operation stick 2 to the neutral position, then the operator can cause the hydraulic actuator 30 to stop.

On the other hand, if the operator switches the selection switch 3 to the target acceleration table 5 side, then the hydraulic actuator 30 is controlled so as to work with a actuation acceleration corresponding to the operation amount of the operation stick 2. In this case, if the operator keeps the operation amount fixed, then the operator can cause the hydraulic actuator 30 to work at a fixed actuation acceleration, but if the operator returns the operation stick 2 to the neutral position, then the operator can cause the actuation velocity of the hydraulic actuator 30 to keep fixed.

Accordingly, with the hydraulic control apparatus 1 of the present embodiment, the operator can optionally select, by switching of the selection switch 3, such a control method that the actuation velocity of the hydraulic actuator 30 is adjusted in accordance with the operation amount of the operation stick 2 or such a control method that the actuation acceleration of the hydraulic actuator 30 is adjusted in accordance with the operation amount of the operation stick 2, and as a result, the operation characteristic of the hydraulic actuator 30 can be adjusted easily to an operation characteristic coincident with the liking of the operator. In particular, as to a revolution motor, since there is a demand to make it possible to adjust the revolution acceleration of the upper revolving unit in response to the operation amount of the operation stick 2, the effect described above is strikingly demonstrated where the hydraulic actuator 30 is a revolution motor. Naturally, the hydraulic control apparatus 1 of the present embodiment can be applied also to the other hydraulic actuators such as a boom cylinder, an arm cylinder, a bucket cylinder, and a travelling motor.

Further, with the hydraulic control apparatus 1 of the present embodiment, the target velocity table 4 is set as a default table, that is, a basic table and the target acceleration table 5 can be selected when necessary by means of the selection switch 3. As a result, a sense of incongruity of the operator when the operator transfers from a general construction machine wherein the actuation velocity of a hydraulic actuator is adjusted in response to an operation amount of an operation stick to a construction machine to which the present invention is applied is eliminated, and also an operation miss arising from a change of the operation characteristic can be prevented.

Further, with the hydraulic control apparatus 1 of the present embodiment, by action of the active vibration control circuit 10, vibration components in the control signal produced by the instruction value follow-up control circuit 9 can be suppressed and attenuated in a positive manner. Consequently, the operation performance of the hydraulic actuator 30, particularly, the vibration damping performance during operation can be further improved, and soft vibration conveyed to the operator cab can be suppressed. As a result, it can be prevented that an unpleasant feeling like a seasickness is given to the operator.

Furthermore, with the hydraulic control apparatus 1 of the present embodiment, as a sensor for feedback control, only the acceleration sensor 20 is required, and also the instruction value follow-up control circuit 9, the active vibration control circuit 10 and so forth can be commonly used for the feedback control. In particular, with the hydraulic control apparatus 1 of the present embodiment, if only software for a conventional hydraulic control apparatus is modified, then the control method wherein the actuation velocity of the hydraulic actuator 30 is adjusted based on the operation amount of the operation stick 2 and the control method wherein the actuation acceleration of the hydraulic actuator 30 is adjusted based on the operation amount of the operation stick 2 can be realized.

While the embodiment of the hydraulic control apparatus for a construction machine of the present invention is described, the present invention is not limited to the embodiment specifically described above, but variations and modifications can be made without departing from the scope of the present invention. For example, while in the embodiment described above, the acceleration sensor 20 is provided and the signal detected by it is integrated to calculate the actuation velocity of the hydraulic actuator 30, the hydraulic control apparatus may be configured otherwise such that a velocity sensor is provided and the signal detected by it is differentiated to calculate the actuation acceleration of the hydraulic actuator 30.

INDUSTRIAL APPLICABILITY OF THE INVENTION

As described above, the hydraulic control apparatus for a construction machine of the present invention is suitable for use with hydraulic control of a construction machine which includes a hydraulic pump, a hydraulic actuator driven by pressure oil supplied from the hydraulic pump and a control valve for controlling the pressure oil supplying amount from the hydraulic pump to the hydraulic actuator.

What is claimed is:

1. A hydraulic control apparatus for a construction machine including a hydraulic pump (16), a hydraulic actuator (30) driven by pressure oil supplied from said hydraulic pump (16), a control valve for controlling a pressure oil supplying amount from said hydraulic pump (16) to said hydraulic actuator (30), characterized in that it comprises:

an operation member (2) for being operated by an operator;

a target velocity table (4) which stores target actuation velocities of said hydraulic actuator (30) corresponding to operation amounts of said operation member (2);

a target acceleration table (5) which stores target actuation accelerations of said hydraulic actuator (30) corresponding to operation amounts of said operation member (2);

a selection switch (3) for selecting one of said target velocity table (4) and said target acceleration table (5) in response to an operation by the operator; and control means for setting a target value corresponding to an operation amount of said operation member (2) using one of said tables selected by said selection switch (3) and controlling said control valve (17) based on the set target value.

2. The hydraulic control apparatus for a construction machine as set forth in claim 1, characterized in that said control means includes:

first signal detection means (20) for detecting a first signal correlating to the actuation velocity or the actuation acceleration of said hydraulic actuator (30);

second signal calculation means (21) for differentiating or integrating the first signal to calculate a second signal correlating to the actuation velocity or the actuation acceleration of said hydraulic actuator (30) but different from the first signal;

comparison means (7) for selecting, in an interlocking relationship to the selection of said selection switch (3), one of the first signal detected by said first signal detection means (20) and the second signal calculated by said second signal calculation means (21) and comparing the selected signal with the target value; and control signal production means (9) for producing a control signal for controlling said control valve (17) based on a comparison signal from said comparison means (7).

3. The hydraulic control apparatus for a construction machine as set forth in claim 2, characterized in that said control means further comprises:

a bandpass filter (10A) for passing a characteristic frequency of pressure vibration of said hydraulic actuator (30) and vibration component signals around the characteristic frequency but cutting a DC component;

a high-pass filter (10B) for extracting a positive vibration component signal from the vibration component signal passed through said bandpass filter (10A);

a low-pass filter (10C) for extracting a negative vibration component signal from the vibration component signal passed through said bandpass filter (10A); and control signal correction means (11, 12) for correcting the control signal using the signal from said high-pass filter (10B) and the signal from said low-pass filter (10C).

4. The hydraulic control apparatus for a construction machine as set forth in any one of claims 1 to 3, characterized in that said hydraulic actuator (30) is a revolving motor for revolving an upper revolving unit of said construction machine with respect to a lower traveling unit.

5. The hydraulic control apparatus for a construction machine as set forth in any one of claims 1 to 3, characterized in that said hydraulic actuator (30) is a hydraulic cylinder of said construction machine.

6. The hydraulic control apparatus for a construction machine as set forth in any one of claims 1 to 3, characterized in that said hydraulic actuator (30) is a traveling motor for driving a lower traveling unit of said construction machine.

7. The hydraulic control apparatus for a construction machine as set forth in any one of claims 1 to 3, characterized in that said target velocity table (4) can be selected as a basic table and said target acceleration table (5) can be selected when necessary by said selection switch (3).

8. The hydraulic control apparatus for a construction machine as set forth in claim 4, characterized in that said target velocity table (4) can be selected as a basic table and said target acceleration table (5) can be selected when necessary by said selection switch (3).

9. The hydraulic control apparatus for a construction machine as set forth in claim 5, characterized in that said target velocity table (4) can be selected as a basic table and said target acceleration table (5) can be selected when necessary by said selection switch (3).

10. The hydraulic control apparatus for a construction machine as set forth in claim 6, characterized in that said target velocity table (4) can be selected as a basic table and said target acceleration table (5) can be selected when necessary by said selection switch (3).

* * * * *